Patented Apr. 1, 1930

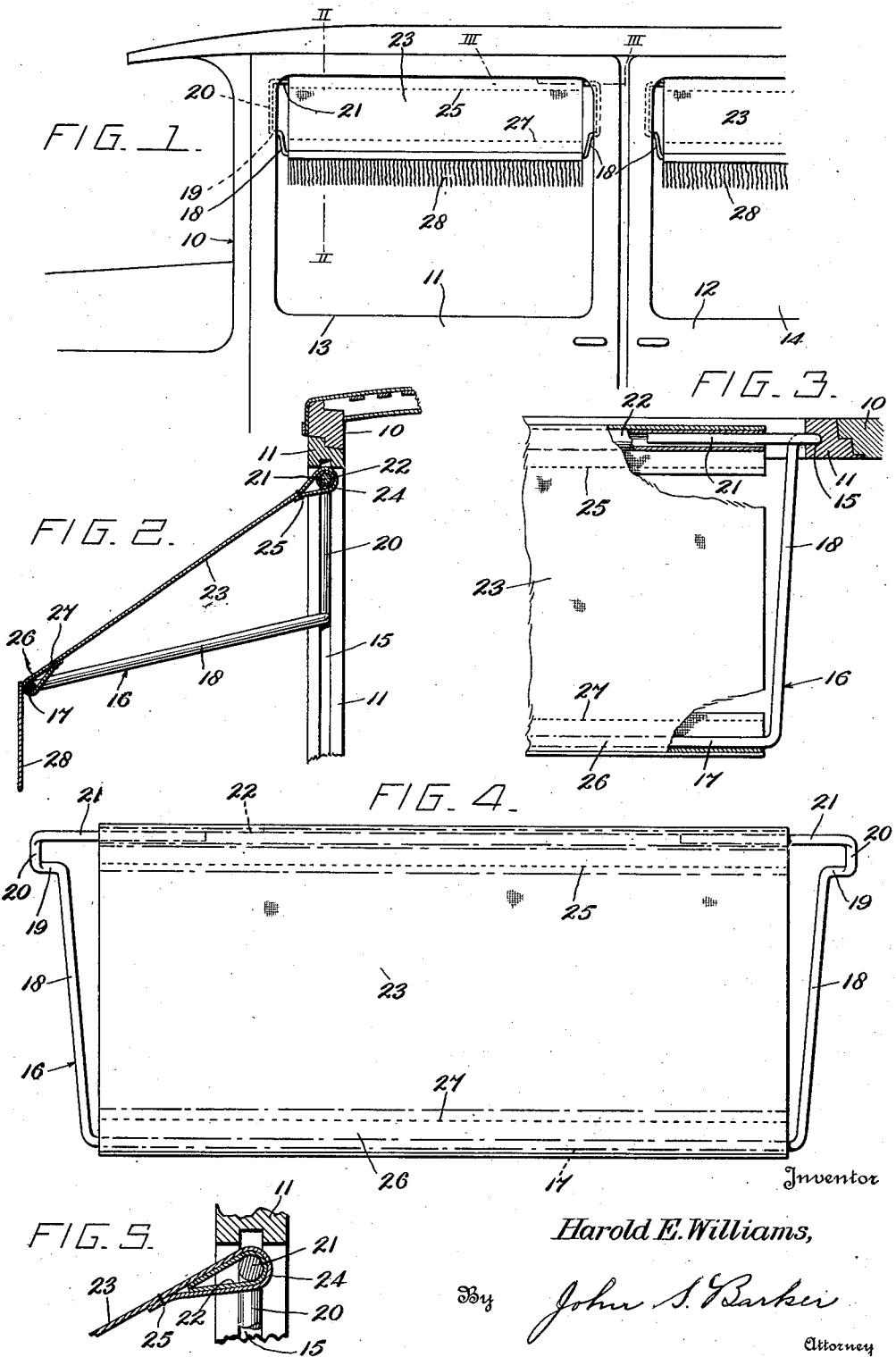

1,753,102

UNITED STATES PATENT OFFICE

HAROLD E. WILLIAMS, OF CARTHAGE, MISSOURI

AWNING

Application filed August 23, 1926. Serial No. 131,081.

This invention relates to shades or awnings and more particularly to a sun and rain shield for automobiles and has for one of its objects to provide a device of this character which will be simple in construction, comparatively inexpensive to manufacture and more efficient in use than those which have been heretofore proposed.

It has recently become the practice to provide automobiles, particularly those of the closed body type, in addition to the usual sun and rain visors employed in conjunction with the wind shields, with side awnings or sun shades which are attached to the entrance doors of the vehicle so as to protect the occupants from the direct rays of the sun and also from rain, snow and the like in case of inclement weather.

The present invention has for a further object, the provision of an awning or shade of this type which may be readily and quickly attached to and detached from the vehicle doors, or windows.

With the above and other objects in view, which will appear as the description proceeds, the invention consists in the novel details of construction, and combinations and arrangements of parts, more fully hereinafter disclosed and particularly pointed out in the appended claims.

Referring to the accompanying drawings forming a part of this specification in which like reference characters designate like parts in all of the views:

Figure 1 is a diagrammatic side elevational view of a portion of the body of a motor vehicle of the well known closed type with a shade or awning constructed in accordance with the present invention, in place thereon;

Fig. 2 is an enlarged transverse sectional view taken approximately on the plane indicated by the line 2—2 of Fig. 1;

Fig. 3 is a fragmentary sectional plan view taken approximately on the plane indicated by the line 3—3 of Fig. 1;

Fig. 4 is a top plan view of the shade or awning constituting the present invention detached from the vehicle; and, Fig. 5 is a fragmentary cross sectional view on an enlarged scale of a slightly modified form of the invention.

Referring more particularly to the said drawings, the numeral 10 indicates generally a vehicle body of the closed type provided with the usual doors 11 and 12, having openings 13 and 14 respectively, which may be closed by panes of glass, not shown and which are slidably mounted in the usual grooves or glass runs 15, provided in the door frames.

The awning or shade constituting the present invention comprises a frame 16 which is preferably formed from a rod or tube of metal which is bent into substantially U-shape to provide a front portion 17 and the side portions 18 integral therewith. The said side portions 18 are provided with a short outward bend 19 and are then bent upwardly as at 20 and inwardly as at 21. The inwardly projecting ends of the rod are slidably received within a hollow tube 22 which forms the fourth side of the substantially rectangular frame, about which, one edge of a canvas or other suitable awning member 23 is looped as at 24 and secured as by stitches 25. The opposite edge of the member 23 is looped about the front member 17 of the frame as at 26 and is secured in place by suitable stitches 27. The looped front edge of the member 23 may be provided with fringe 28 or other similar ornamental material.

The frame member 16 is formed of such dimensions as to provide a certain amount of resilience in the side arms 18 and due to the sliding of the inturned ends 21 within the tubular member 22, it is possible to spring these side members 18 inwardly toward each other so as to permit of the upwardly extending side members 20 being introduced into the grooves or glass runs 15 of the door as indicated in Figs. 1, 2 and 3. Upon releasing the side members 18, the resilience of the metal frame will cause the said side members to spring outwardly again, thereby causing the portions 20 thereof to frictionally engage in the grooves or runs 15 whereby the shade or awning will be readily detachably secured to the door solely through the frictional engagement. Obviously, the shade may be quickly attached to and detached from the door as occasion may require and when in position will serve to effectively protect the occupants of the car from the rays of the sun or from rain, snow and the like which normally would enter through the openings 13 and 14 in the doors.

The awning frame is not only resilient transversely, as described, but is resilient longitudinally as well. That is to say, the front and rear members of the frame,—the former designated 17 and the latter 21,—may be sprung toward each other, as when the canvas or other awning member 23 is being applied. Then, upon being released, these front and rear members, through the resiliency of the frame, tend to return to normal relationship and operate to maintain the awning taut.

The upwardly extending side members 20 are preferably made relatively short as shown, so as to occupy only a portion of the length of the glass runs 15 so that if desired, the glass plates of the doors may be raised in the usual manner until the top edge thereof is substantially level with the portions 19 of the frame. It is thus possible to close the door windows to further protect the occupants of the car against the elements while at the same time ventilation is provided beneath the shade or awning 23.

It will thus be seen that the present invention provides a shade or awning particularly adapted for use in connection with the entrance doors and windows of motor vehicles which may be cheaply manufactured and which may be readily attached to and detached from the said doors.

Furthermore, that the said awning is securely held in position solely by frictional engagement with the door, making it possible to employ the same without in any way altering or marring the doors of vehicles already in use and without the necessity of employing special attachments.

While one form of the invention has been thus illustrated and described, it is obvious that those skilled in the art may vary the details of construction as well as the precise arrangements of parts without departing from the spirit of the invention and therefore, it is not wished to be limited to the above disclosure except as may be required by the claims.

What is claimed is:

1. In a vehicle sun and rain shield of the non-collapsible type, a frame comprising a tubular back member, and a single rod bent to form a front member substantially parallel to said back member, and rearwardly extending resilient side members, the rear portions of said side members being bent outwardly, then upwardly, and then inwardly, to provide a pair of vertical glass run engaging members and a pair of spaced opposed inturned ends which are slidably received within said tubular back member; and a cover secured to said front and back members.

2. In a vehicle sun and rain shield, a frame comprising front, back and side rods and a cover supported upon the front and back rods, the back rod being a tube and the balance of the frame formed of a single piece of resilient wire bent to form the front rod and the side rods, the side rods tending to spring outwardly by their own resilience and formed with portions adapted to engage with the glass run of a window frame and the free ends of such side rods carrying inwardly projecting extensions adapted to enter the ends of the tubular rear rod of the frame.

HAROLD E. WILLIAMS.